Patented Dec. 2, 1952

2,620,357

UNITED STATES PATENT OFFICE 2,620,357

PRODUCTION OF UNSATURATED CARBONYL COMPOUNDS

Erving Arundale, Westfield, and Henry O. Mottern, Bloomfield, N. J., assignors to Standard Oil Development Company, a corporation of Delaware No Drawing. Application August 22, 1949, Serial No. 111,774

9 Claims. (Cl. 260—596)

This invention relates to a novel catalytic process and, more particularly, to an improved method for preparing unsaturated carbonyl compounds in good yields from glycol compounds by passing glycols over suitable catalytic materials.

It is well known that the simple dehydrogenation of secondary alcohols to the corresponding ketones may be achieved by passing the alcohols at elevated temperatures over substances acting substantially as dehydrogenation catalysts. Early developments in this field led to the use of metals such as copper, brass, etc., as catalysts in this type of reaction. Somewhat later, various difficultly reducible metallic oxides such as zinc oxide, cerium oxide, magnesium oxide, etc., attained considerable prominence as dehydrogenation catalysts. Various combinations of catalytic metals and difficultly reducible metallic oxides have also been employed. It has been found that a certain number of these difficultly reducible metallic oxides have a residual catalytic dehydrating effect as well as the above-mentioned dehydrogenating effect, and that both effects may be advantageously utilized in one over-all reaction to convert glycols to unsaturated carbonyl compounds.

An object of the present invention is to utilize the dehydrogenation activity of difficultly reducible metallic oxide catalysts such as magnesium oxide, zinc oxide, and beryllium oxide and, at the same time, utilize the residual activity of these catalysts as dehydration catalysts, particularly when these oxides are employed as mixtures.

Another object of this invention is to provide a process for the preparation of unsaturated carbonyl compounds from glycols by a catalytic process, wherein the products are relatively clean, are easily separated and purified, and produced in good yields from the starting materials. These and other objects will be apparent to those skilled in the art from the following description.

Only a special class of catalysts is suited for use in this combined dehydrogenation and dehydration process. These catalysts contain or consist essentially of a major portion of an oxide of zinc, magnesium, or beryllium, and a minor portion of an oxide of zirconium, cerium and thorium. The latter oxides are present in minor amounts ranging from 1 to 15 weight per cent, preferably 6 to 12 weight per cent, based on the total weight of the combined oxides present in the catalyst. It has been found that from 1 to 15 per cent by weight of at least one of the oxides of zirconium, cerium and thorium, based upon the total weight of the catalyst composition, greatly improves the action of the magnesium oxide, zinc oxide, or beryllium oxide as a dehydrogenation catalyst.

The reaction obtained by using less than 1% of the zirconium oxide, cerium oxide, or thorium oxide, or mixtures thereof, is perceptible but not sufficient to be of any appreciable value, while the improvement obtained by using more than 15% of these oxides is not sufficiently great over that obtained when using about 6 to 12% to warrant the additional expenditure necessary to employ the material.

It also has been found that catalysts of the type described can be stabilized in a desirable fashion by the addition thereto of approximately 6 to 10% based on the weight of the zirconium oxide, cerium oxide, or thorium oxide, of a stabilizer selected from the group consisting of ferric oxide, silica and alumina.

Other metallic oxides may be advantageously added to the promoted zinc oxide catalyst. The presence of such stabilizers is of especial value when the glycol feed stock contains impurities which cause inactivation of the catalyst while it is in use. For instance, the catalyst prepared from the two oxides may be seriously inactivated by carbon or resin deposition unless small amounts of $SiO_2$, $Al_2O_3$ or $Fe_2O_3$ are also included in the composition. This effect is particularly deleterious when the glycol feed stock contains impurities which resinify or carbonize under the conditions of the reaction.

There are various grades of zirconia which may be employed in the preparation of the zirconia-containing catalysts of this invention and which are capable of both dehydrogenation and dehydration actions. Typical analyses of some of the grades of zirconia suitable for use in preparing these catalysts are as follows:

|  | Tamopax[1] | C. P. Grade | Electrically Fused | Spectroscopic Reference Sample |
|---|---|---|---|---|
| Percent $ZrO_2$ | 87.97 | 99.37 | 97.10 | 99.943 |
| Percent $SiO_2$ | 8.49 | 0.30 | 1.88 | 0.020 |
| Percent $Al_2O_3$ | 0.38 | 0.08 | 0.52 | 0.005 |
| Percent $MgO$ | 0.30 | 0.05 | 0.05 | 0.005 |
| Percent $Na_2O$ (as silicate) | 1.50 | 0.02 | 0.02 | 0.002 |
| Percent $TiO_2$ | 0.30 | 0.15 | 0.30 | 0.005 |
| Percent $Fe_2O_3$ | 0.08 | 0.03 | 0.11 | 0.020 |

[1] A grade of zirconia manufactured by the Titanium Alloy Manufacturing Company, Niagara Falls, New York.

It is believed, however, that the catalytic effect of the zirconia added to the oxides of zinc, magnesium or beryllium, is due to the zirconium oxide itself, and not to the impurities contained therein, although there is some indication that the presence of small amounts of $SiO_2$ may be beneficial in giving the combined action. For this reaction, it is a preferred feature of this invention to use a zirconia promoted zinc oxide catalyst containing small amounts of silica.

The preparation of the catalysts of this invention may be exemplified by the preparation of a zinc oxide—zirconium oxide catalyst. In the preparation of the catalyst, it is preferred to mix the two oxides in the proper proportions in powdered form, then to work enough water into the mixture to make a heavy slurry. This will ordinarily require a volume of water approximately equal to the volume of powder employed. The catalyst slurry is then preferably coated on a carrier. The coating operation may be accomplished by placing the catalyst support or carrier in a tumbling device, pouring the catalyst slurry over the carrier, and then tumbling until a uniform thick mix is secured. The mix is then placed in an oven at a temperature of about 80° C. and dried. The drying requires approximately 24 to 48 hours. Metal turnings may be employed as the catalyst carrier or support, or pumice in granular or pill form may be used as well as other types of carriers which are well known in the catalyst art. Pumice and metal turnings are preferred carriers, however, and of the metal turnings, steel or brass turnings are preferred.

These catalysts may be employed either for fixed bed operations or as a part of a fluid operation using the catalyst in a fluidized state. Nitrogen or other inert gas may be used as the fluidizing medium. The catalyst will need to be regenerated from time to time since a certain degree of catalytic activity will tend to be lost after a period of conversion. The regeneration can best be accomplished by treatment of the spent catalyst at elevated temperatures with steam or air or with a mixture of the two. At least 80% of the original activity may be restored in this manner. The catalytic and reactivating periods may be alternately repeated throughout the life of the catalyst. Certain impurities and contaminants tend to act as poisons for the catalyst and their presence in the feed will substantially reduce the activity of the catalyst. These so-called poisons include halogens, sulfur compounds such as sulfides and mercaptans, and nitrogen compounds such as amines, nitriles, amides, and nitro compounds.

This specific catalytic reaction is particularly useful in the production of unsaturated carbonyl compounds from glycol type materials. It is necessary, however, that these glycols have a certain type of structure in order that the preferred product, the unsaturated carbonyl compound, be obtained in high yield and the formation of undesirable by-products avoided.

This catalyst may be effectively employed to convert compounds of the following general formula to unsaturated carbonyl compounds:

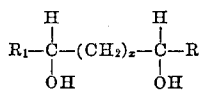

wherein R may be hydrogen or a hydrocarbon radical, $R_1$ is a hydrocarbon radical and $x$ is a small whole number of value at least 1. The hydrocarbon radical may be an alkyl, aryl, or cycloalkyl radical such as, for example, methyl, ethyl, propyl, butyl, phenyl, cyclohexyl, or cyclopentyl or various substituted radicals in which the substituting groups do not interfere with the activity of the catalyst. It is preferred to have the hydrocarbon radicals selected from the aliphatic series and the total molecule containing no more than ten carbon atoms, otherwise the compound is very high-boiling and gives difficulty in vaporization.

There is no exact limit as to the number of carbon atoms which the glycol can have, although very high molecular weight glycols are generally not readily available and would also have prohibitively high boiling points.

Specific examples of representative compounds as starting feeds include the following materials: 1,3-butanediol, 2-ethyl-1,3-hexanediol, 2-methyl-1,3-hexanediol, 1,3-pentanediol, 2,4-pentanediol, and 2-methyl-1,3-butanediol.

Certain of the diols can be made by condensation of two molecules of an aldehyde or ketone under alkaline conditions and subsequent reduction of the resulting hydroxy carbonyl compound. Where one of the hydroxyl groups of a glycol product from an aldol is tertiary, the desired reaction to form an unsaturated compound will generally not be obtained but rather the catalyst will reverse the aldol. This dealdolization probably proceeds in two steps, that is, first the tertiary hydroxyl group is easily dehydrated to give the olefin then the molecule splits to give degradation products and essentially little or no unsaturated carbonyl compound is formed. Thus all glycol products formed from the condensation of ketones are considered to be of no practical value for use as feed stocks in the process since only degraded products will be isolated.

It is also advisable to avoid the use of glycol products in which the hydroxyl groups are on adjacent carbon atoms such as the glycols formed by mild oxidation or hydration of isolated double bonds since these compounds can only yield alpha unsaturated carbonyl compounds which are unstable and will polymerize and decompose. Thus there should be at least one methylene group between the hydroxyl groups of the glycol compound. Furthermore, alpha-omega dihydric alcohols are of little use as they tend to yield dialdehydes which are also unstable and generally impossible to isolate in the pure state. However, glycols obtained in other ways can be used as can the 1,3 type glycols obtained in by aldol condensations of aldehydes. Such methods for obtaining suitable feed materials for the reaction include the reaction of olefins and formaldehyde, polyhalogenation, followed by hydrolysis of the halogen-containing compounds with alkali and aldol condensations of aldehydes.

To summarize, the preferred structure for the glycols to be converted to unsaturated carbonyl compounds should be a glycol having no tertiary hydroxyl group, at least one secondary hydroxyl group, and having at least one methylene grouping located between the hydroxyl groups.

Predictions as to the exact type of unsaturated carbonyl compounds which will be formed from any particular glycol of a known structure can be made but only with a limited degree of accuracy. It is quite easy to determine which unsaturated carbonylic compounds will be formed, although it will be unlikely that the exact ratio of amounts in which they are formed cannot be foreseen. Since tertiary hydroxyl groups are to be avoided, the preferred glycol feed will contain at least one secondary hydroxyl group, the other hydroxyl group being primary or secondary. Generally speaking, hydroxyl groups in the secondary position are more reactive both toward dehydrogenation and dehydration. Thus, from any particular glycol it is unlikely that there will be obtained only one product to the exclusion of other possible products and mixtures will generally be the result with the ratio of components varying, depending on the reactivity of the particular compound and on the severity of the reaction conditions. For instance, as in Example 1 below, when the 1,3-butanediol is passed in vapor phase over a zinc oxide-zirconium oxide catalyst at 750° F., a mixture of methyl vinyl ketone and crotonaldehyde is obtained in the condensate from the catalytic zone together with unreacted glycol. Similarly, two types of products are obtained from 2-ethyl 1,3-hexanediol when it is used as the feed stock. The mixtures so formed can be separated into the components readily by known methods, including physical separations such as fractional distillation, and chemical means such as various types of selective formation of derivatives. By-products of the unwanted type compounds such as ethers, hydrocarbons, and resins and polymers represent only a minor part of the total diol converted and do not present a serious problem.

The conversion of these selected type glycols to unsaturated carbonyl compounds is accomplished by passing the glycol in vapor form through a catalyst contacting zone such as a catalyst tube or column, the catalyst mass being heated to a temperature of about 400° to 1000° F., preferably 500° to 800° F., as an optimum, at atmospheric pressure, and a feed rate of from 0.5 to 6 volumes, preferably 1.5 to 3 volumes, of liquid glycol per volume of catalyst per hour. The catalyst used was prepared essentially by the above-described method. Pressures above atmospheric are not desirable since increased decomposition seems to occur when the reaction is carried out at the higher temperatures. On the other hand, reduced pressures are generally helpful and are advantageously used in conversions involving high-boiling feed materials since product stability will be thereby promoted. If the feed and/or products tend to give extensive decomposition, it may be desirable to take a low conversion rate and recycle to get better yields. The exact temperatures best employed depend somewhat on the rate of feed passed over the catalyst, conversion rate desired, boiling point and decomposition temperature of the feed and the activity of the catalyst. The product vapors are passed to a condenser where the mixtures of products and unreacted glycol are separated by condensation from the less readily condensible gas consisting predominantly of hydrogen and a small amount of olefin hydrocarbon and decomposition materials.

The glycols employed in the dehydrogenation process may contain small quantities of water up to 12% without seriously affecting the formation of the unsaturated carbonyl compound.

The following examples, intended merely for purposes of illustration and not intended as a limitation, serve to demonstrate the effectiveness of the catalyst described for the combined action of dehydrogenation and dehydration of glycols under the conditions indicated to yield unsaturated carbonyl compounds. The examples demonstrate the effectiveness of the catalyst to carry out the desired reaction.

*Example 1*

1,3-butanediol vapor was passed over a 120 cc. catalyst bed composed of essentially 94 wt. % $ZnO_2$ and 6 wt. % $ZrO_2$ (Tamopax) containing about 8.5 wt. % silica based on the weight of Tamopax used, at a temperature of 750° F. The flow rate of feed was 1.5 V/V/hr. During the 30 minute run, 550 cc. of feed was passed over the catalyst and 570 cc. of crude condensed products was recovered. The recovered crude products were fractionated to give the following data:

| Product | | Vol., cc. | Vol. Percent Conversion | Percent Yield |
|---|---|---|---|---|
| Fraction 1 | Methyl vinyl ketone | 305 | 53.5 | 66.7 |
| Fraction 2 | Crotonaldehyde | 152 | 26.7 | 33.3 |
| Fraction 3 | Unconverted 1,3-butanediol | 113 | 19.8 | |

It can be seen that the ratio of ketone to aldehyde produced from this feed is of the order of 2 to 1. In order to produce the ketone, the secondary hydroxyl group must undergo dehydrogenation while the primary group is dehydrated. To produce the crotonaldehyde, the primary hydroxyl group is dehydrogenated and the secondary group becomes dehydrated.

*Example 2*

2-ethyl-1,3-hexanediol vapor was passed over a solid catalyst consisting of 94 wt. % $ZnO_2$ and 6 wt. % $ZrO_2$ (Tamopax), containing about 8.5 wt. % silica based on the weight of Tamopax used, at an average temperature of 750° F., and at a rate of 1.5 V/V/hr. During a typical run 540 cc. of glycol was fed and the volume of crude condensate recovered was 555 cc. Approximately 507 cc. of this crude was fractionally distilled at atmospheric pressure and the following fractionation data obtained:

| | Temp., °C. | Vol. cc. |
|---|---|---|
| Fraction 1 | ¹ 61–110 | 107 |
| Fraction 2 | 110–155 | 136 |
| Fraction 3 | 155–173 | 65 |
| Fraction 4 | >173 | 173 |

¹ Fraction 1 contained 14 cc. of water.

The low-boiling Fraction 1 is a mixture of low-boiling decomposition products together with various azeotropes of these compounds with water. Fraction 2 is indicated to be 2-ethyl-1-hexene-3-one which is reported in the literature to boil at 157°–159° C. The presence of low boiling impurities have evidently lowered the boiling point of the crude fraction containing this hexene-one. Fraction 3 is indicated to be essentially a mixture of the two isomeric aldehydes, 2-ethyl-3-hexenal-1 and 2-ethyl-2-hexenal-1 boiling in the range of 168°–173° C. Fraction 4 represents the unconverted 2-ethyl-1,3-butanediol which can be recycled to the catalytic zone. A relatively small portion of gaseous by-products were recovered from the catalytic zone.

Example 3

As an example of the type of glycol in which one hydroxyl group is tertiary, 2-methyl-2,4-pentanediol was passed over the same solid catalyst bed as that described as used in Example 1 and under substantially the same conditions of operation. The products, however, indicated a great deal of decomposition of starting feed and consisted predominantly of a mixture of acetone and water and unreacted glycol with a small amount of mesityl oxide. The acetone, no doubt, resulted from the dealdolization of the feed stock and its intermediate products.

What is claimed is:

1. The method of converting glycols to unsaturated carbonyl compounds which comprises passing a glycol having the structure

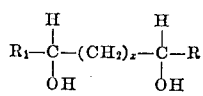

in which R is a radical selected from the group consisting of hydrogen and hydrocarbon radicals, $R_1$ is a hydrocarbon radical, and $x$ is the whole integer 1, in the vapor phase at 400 to 1000° F. over a catalyst mixture consisting essentially of a major component A selected from the group consisting of zinc oxide, magnesium oxide, and beryllium oxide, and from 1 to 15 per cent by weight of a minor component B, selected from the group consisting of zirconium oxide, cerium oxide, and thorium oxide based on the total weight of the catalyst mixture.

2. A process according to claim 1 in which the catalyst contains 6 to 10 weight per cent of silica, based on the weight of component B.

3. A process according to claim 1 in which the catalyst is deposited on metal turnings as a carrier.

4. A process according to claim 1 in which the catalyst is maintained at a temperature of 500° to 800° F.

5. The method of producing a mixture of unsaturated carbonyl compounds, consisting essentially of crotonaldehyde and methyl vinyl ketone in which 1,3-butanediol is passed in vapor phase at 500° F. to 800° F. over a catalyst consisting essentially of a mixture of zinc oxide as component A and from 1 to 15 weight per cent zirconium oxide as component B, based on the total weight of the catalyst mixture.

6. The method according to claim 5 in which the catalyst consists of a mixture of about 94 wt. % $ZnO_2$ and about 6 wt. % $ZrO_2$ with a small amount of silica, and the catalyst temperature is held at approximately 750° F.

7. The method according to claim 6 in which the catalyst is deposited on metal turnings as a carrier.

8. The method of producing a mixture of $C_8$ unsaturated carbonyl compounds in which 2-ethyl-1,3-hexanediol is passed in vapor phase over a catalyst consisting essentially of a mixture of 94 wt. % $ZnO_2$ and 6 wt. % $ZrO_2$ and the catalyst temperature is held at approximately 750° F.

9. The method of producing unsaturated carbonyl compounds, which comprises passing a glycol containing one hydroxyl group attached to a secondary carbon atom, the other hydroxyl group being attached to a primary carbon atom, and having a single carbon atom between the carbon atoms attached to each of the hydroxyl groups, in the vapor phase at a temperature of 500° to 800° F. into contact with a catalyst mixture consisting essentially of a major component A selected from the group consisting of zinc oxide, magnesium oxide, and barium oxide and from 6 to 12 weight % of a minor component B selected from the group consisting of zirconium oxide, cerium oxide, and thorium oxide based on the total weight of the catalyst mixture.

ERVING ARUNDALE.
HENRY O. MOTTERN.

REFERENCES CITED

The following references are of record in the file of this patent:

UNITED STATES PATENTS

| Number | Name | Date |
|---|---|---|
| 1,813,953 | Reppe | July 14, 1931 |
| 2,042,224 | Groll | May 26, 1936 |
| 2,179,488 | Beamer | Nov. 14, 1939 |
| 2,421,554 | Finch et al. | June 3, 1947 |

FOREIGN PATENTS

| Number | Country | Date |
|---|---|---|
| 337,566 | Great Britain | Nov. 6, 1930 |